(12) United States Patent
Hawkins

(10) Patent No.: US 8,065,617 B2
(45) Date of Patent: Nov. 22, 2011

(54) DISCOVERING ALTERNATIVE USER EXPERIENCES FOR WEBSITES

(75) Inventor: Jonathan C. Hawkins, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 702 days.

(21) Appl. No.: 12/200,167

(22) Filed: Aug. 28, 2008

(65) Prior Publication Data

US 2010/0058191 A1    Mar. 4, 2010

(51) Int. Cl.
*G06F 3/00*     (2006.01)
*G06F 17/00*    (2006.01)

(52) U.S. Cl. ........ 715/733; 715/738; 715/205; 715/206; 715/234

(58) Field of Classification Search .............. 715/733, 715/738, 205, 206, 234
See application file for complete search history.

(56) References Cited

U.S. PATENT DOCUMENTS

| | | |
|---|---|---|
| 7,099,870 B2 | 8/2006 | Hsu et al. |
| 7,313,588 B1 | 12/2007 | Shotton, Jr. et al. |
| 2002/0109713 A1 | 8/2002 | Carchidi et al. |
| 2002/0129064 A1 | 9/2002 | Guthrie |
| 2004/0088355 A1 | 5/2004 | Hagan et al. |
| 2005/0038796 A1 | 2/2005 | Carlson et al. |
| 2005/0257128 A1 | 11/2005 | Pasquali |
| 2007/0101276 A1 | 5/2007 | Yuen |
| 2007/0208759 A1 | 9/2007 | von Koch et al. |
| 2007/0250510 A1 | 10/2007 | Nachman |
| 2007/0282858 A1* | 12/2007 | Arner et al. .................. 707/10 |
| 2008/0104195 A1 | 5/2008 | Hawkins |
| 2009/0006976 A1* | 1/2009 | Im ............................. 715/738 |

FOREIGN PATENT DOCUMENTS

| | | |
|---|---|---|
| KR | 10-1998-0063503 | 10/1998 |
| WO | WO0150371 A2 | 7/2001 |
| WO | WO2006047218 A2 | 5/2006 |

OTHER PUBLICATIONS

Guldman, Andrew, "Building Rich Internet Applications with Macromedia Flash MX and ColdFusion MX", May 2002, 38 pages.
Ask Web Hosting, "Cynergy Unlocks the Hidden Potential of Rich Internet Applications through Cynergy Labs", Jan. 2008, 3 pages.
EXADEL, Inc., "Delivering Rich Internet Applications with Ajax4jsf", 2006, 10 pages.
RSS Specifications, "Steps to Create & Promote RSS Feeds", copyright 2004-2007 NotePage, Inc., 2 pages.
BETA Daily, "Which Rich Internet Application (RIA) Technology Will Lead the Pack", Mar. 2008, 8 pages.

* cited by examiner

*Primary Examiner* — Ting Lee
(74) *Attorney, Agent, or Firm* — Workman Nydegger

(57) ABSTRACT

The present invention extends to methods, systems, and computer program products for discovering alternative user experiences for Websites. Embodiments of the invention permit a user to navigate to a Web page that has an alternative application for a Web site. In response to a Web browser detecting the alternative application a user-interface control at the Web browser can be activated. A user can then select the user-interface control to install the alternative application in an alternative application control center. Through the alternative application control center, a user activates alternative applications to interact with Web sites having alternative user experiences.

18 Claims, 6 Drawing Sheets

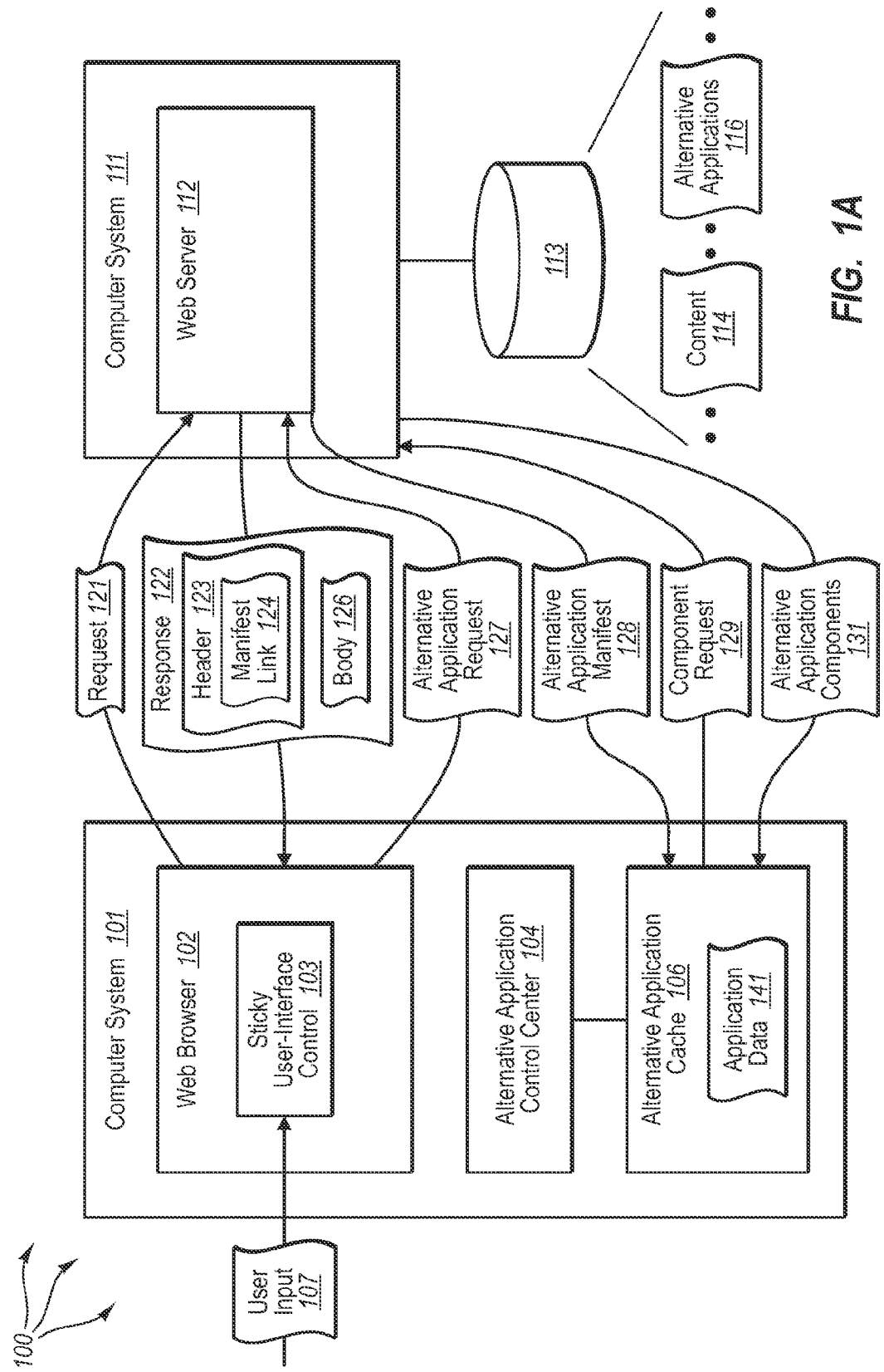

DISCOVERING ALTERNATIVE USER EXPERIENCES FOR WEBSITES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

For example, on the Internet, computer systems often operate in a client/server arrangement. One computer system including a Web browser requests data from another computer system including a Web server. Communication between the Web browser and Web server is typically facilitated using the Hypertext Transfer Protocol ("HTTP"), which is a communications protocol for the transfer of information on the Internet and the World Wide Web ("WWW"). HTTP is a request/response (or synchronous) protocol. A Web browser requests information by submitting a Uniform Resource Locator ("URL") and a Website identified by the URL returns content (typically Hypertext Markup Language ("HTML")) to the Web browser. The Web browser then interprets the content for presentation, such as, for example, through video and/or audio output devices.

Typical Web experiences are advantageous in that any computer system with a properly configured Web browser can access content from a Web site. That is, a Web browser essentially functions as a thin client to provide a small number of well-defined mechanisms for accessing and presenting content. A Web server, in response to a Web browser request, does virtually all of the processing to get data in an appropriate format (e.g., HTML) for presentation at a Web browser.

Unfortunately, this client/server arrangement also has a number of disadvantaged. For example, all interaction with an application is required to pass through a Web server. As a result, data (e.g., a URL) is sent to the server, the server responds, and other data (e.g., a Web page) is reloaded at a Web browser. Thus, typical Web browser operation causes a synchronous (and sometimes slow) loop for user interactions, for example, limiting when Web site content can be presented.

Further, a Web browser's small number of well-defined mechanisms for accessing and presenting content limits how and what types of content can be presented. For example, most Web browsers are not natively configured to present anything other than HTML data. The use of scripts can enhance presentation abilities to of a Web browser to some extent. However, data presentation still occurs within the Web browser and is limited to the Web browser environment.

A variety of applications often referred to as Rich Internet Applications ("RIAs"), can provide alternative experiences with expanded or enhanced capabilities for accessing and presenting Internet-based content (sometimes outside of a Web browser). RIAs utilize an intermediate software layer, sometimes referred to as a client engine, between a Web browser and Web server to circumvent Web browser limitations. A RIA can be programmed to perform virtually any application function a designer believes will enhance some aspect of a user interface or improve its responsiveness when handling various user interactions (e.g., as compared to a standard Web browser implementation). For example, RIAs can provide benefits such as expanded user-interface behaviors not obtainable via HTML, increased responsiveness, client/server workload balancing, asynchronous communication (i.e., communication can occur without a user triggering a response/reply), and network efficiency.

RIAs can be executable (e.g., .exe) files, installation packages (e.g., .msi), or ZIP file installation packages. Unfortunately, gaining access to or even becoming aware of RIAs can vary between different Web sites. For example, a user typically has to read some Website or application specific HTML user-interface of an application to identify a link to an RIA. The use then clicks a specific button or link on the HTML page to trigger downloading and/or installing of an RIA.

BRIEF SUMMARY

The present invention extends to methods, systems, and computer program products for discovering alternative user experiences for Websites. A Web browser submits a request for content to a Web site. The Web browser receives responsive content responsive to the request from the Web site. The Web browser determines that the responsive content includes a link to an application manifest. The application manifest lists one or more alternative applications configured to access content from the Web site.

The Web browser indicates (e.g., through user-interface elements) that that the Web site includes alternative application experiences. The indication is presented in response to determining that the responsive content includes the link to the application manifest. The Web browser receives a user indication of a user desire to retain the alternative application experiences listed in the application manifest. The Web browser downloads components associated with the alternative application experiences to the computer system in response to the user indication.

The Web browser caches the downloaded components at the computer system to retain the alternative application experiences for subsequent use. The Web browser indicates that the alternative user experiences are available through an alternative application center. The alternative application center provides a common location for accessing alternative application experiences for different Web sites This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1A illustrates an example computer architecture that facilitates discovering alternative user experiences for Websites.

DETAILED DESCRIPTION

Figure 1B:
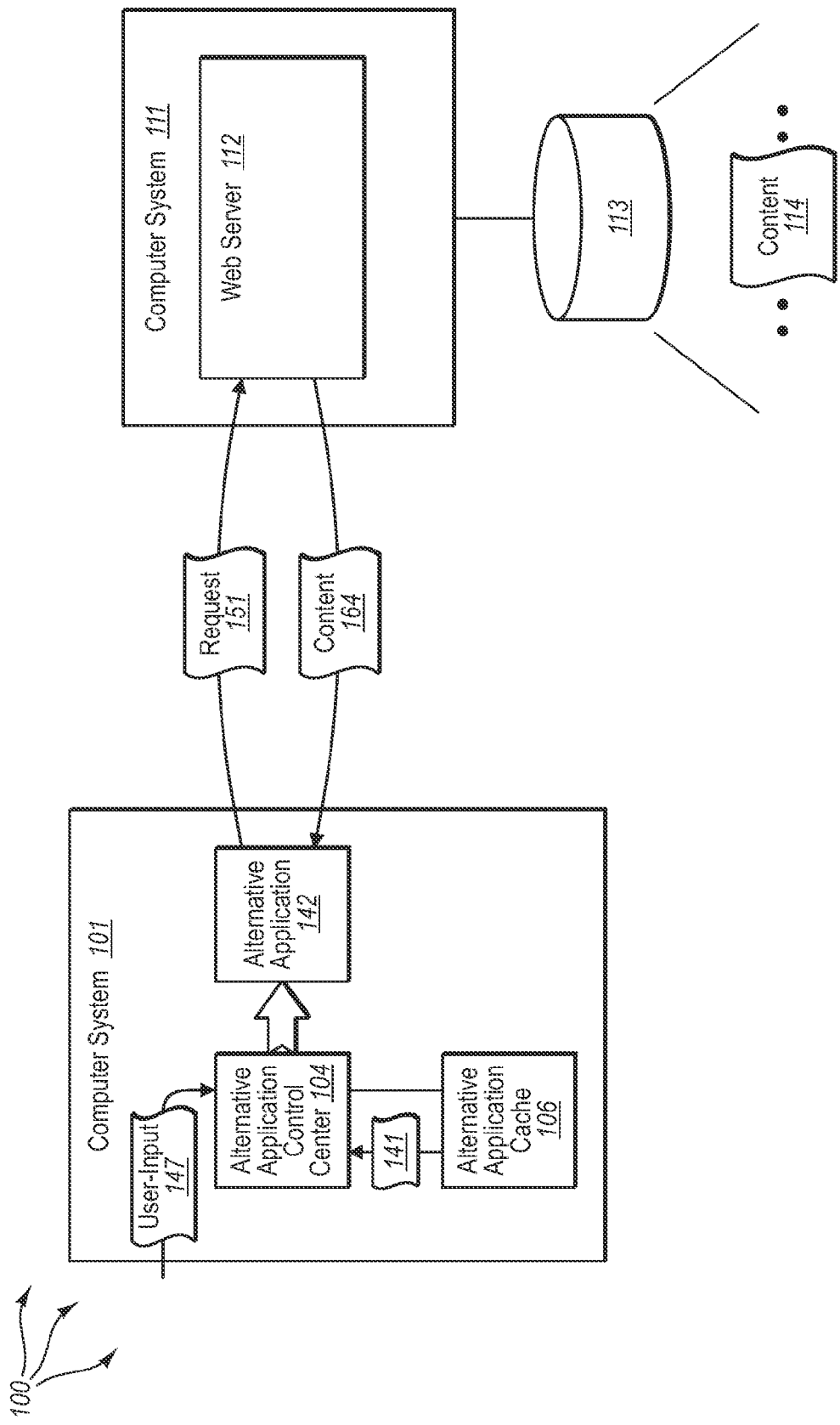
FIG. 1B illustrates an example computer architecture that facilitates activating an alternative user experience for a Website.

The present invention extends to methods, systems, and computer program products for discovering alternative user experiences for Websites. A Web browser submits a request for content to a Web site. The Web browser receives responsive content responsive to the request from the Web site. The Web browser determines that the responsive content includes a link to an application manifest. The application manifest lists one or more alternative applications configured to access content from the Web site.

The Web browser indicates (e.g., through user-interface elements) that that the Web site includes alternative application experiences. The indication is presented in response to determining that the responsive content includes the link to the application manifest. The Web browser receives a user indication of a user desire to retain the alternative application experiences listed in the application manifest. The Web browser downloads components associated with the alternative application experiences to the computer system in response to the user indication.

The Web browser caches the downloaded components at the computer system to retain the alternative application experiences for subsequent use. The Web browser indicates that the alternative user experiences are available through an alternative application center. The alternative application center provides a common location for accessing alternative application experiences for different Web sites.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an example computer architecture 100 that facilitates discovering alternative user experiences for Websites. Referring to FIG. 1A, computer architecture 100 includes computer system 101 and computer system 102. Each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Computer system 101 includes Web browser 102, alternative application center 104, and alternative application cache 106. Generally, Web browser 102 is configured to interact with Web sites to send Web-based data to and receive Web-based data from Web sites (e.g., in HTTP messages, such as, for example, HTTP GET, HTTP HEAD, HTTP POST, HTTP PUT, etc.) and to present Web-based data through a user-interface. Web browser 102 also includes sticky user-interface control 103. Sticky user-interface control 103 can activate (or "light up") when a received message indicates that a Web site has alternative user experiences. A user can then select sticky user-interface control 103 to save or "make sticky" alternative user experiences for Web sites, potentially facilitating use of alternative user experiences when off line.

Alternative application center 104 provides a user-interface for accessing safe alternative user experiences. Alternative application cache 106 is configured to store data for alternative user experiences. When an alternative user experience is saved, data for the alternative user experience can be downloaded to computer system 101 and stored in alternative application cache 106. Alternative application center 104 can visual present (e.g., as icons) alternative user experiences stored in alternative application cached 106 to a user. A user can select an alternative user experience from the list to active the alternative user experience (either acting with the alternative user experience directly or through alternative application center 104).

Computer system 111 includes Web server 112. Generally, Web server 112 is configured to manage content for one or more Websites. Web server 112 can interact with Web browsers and alternative applications to send Web-based data to and receive Web-based data from Web browsers and alternative applications (e.g., in HTTP messages including HTML data). Computer system can return Web-based data from storage 113 in response to data requests received at Web server 112. Responses to data requests can include content from content 114 and/or links to alternative user experiences in alternative applications 116. Web server 112 can include links to any alternative user experiences when returning Web-based data to a Web browser. For example, Web server 112 can include a link element in an HTML header of a HTML message. The link element can link to data (e.g., in alternative applications 116) for activating alternative user experiences provided by Web server 112.

A Web browser, such as, for example, Web browser 102, can activate a user-interface control, such as, for example, sticky user-interface control 103, in response to detecting a link element to an alternative user experience in other received data, such as, for example, in an HTML header.

Figure 2:
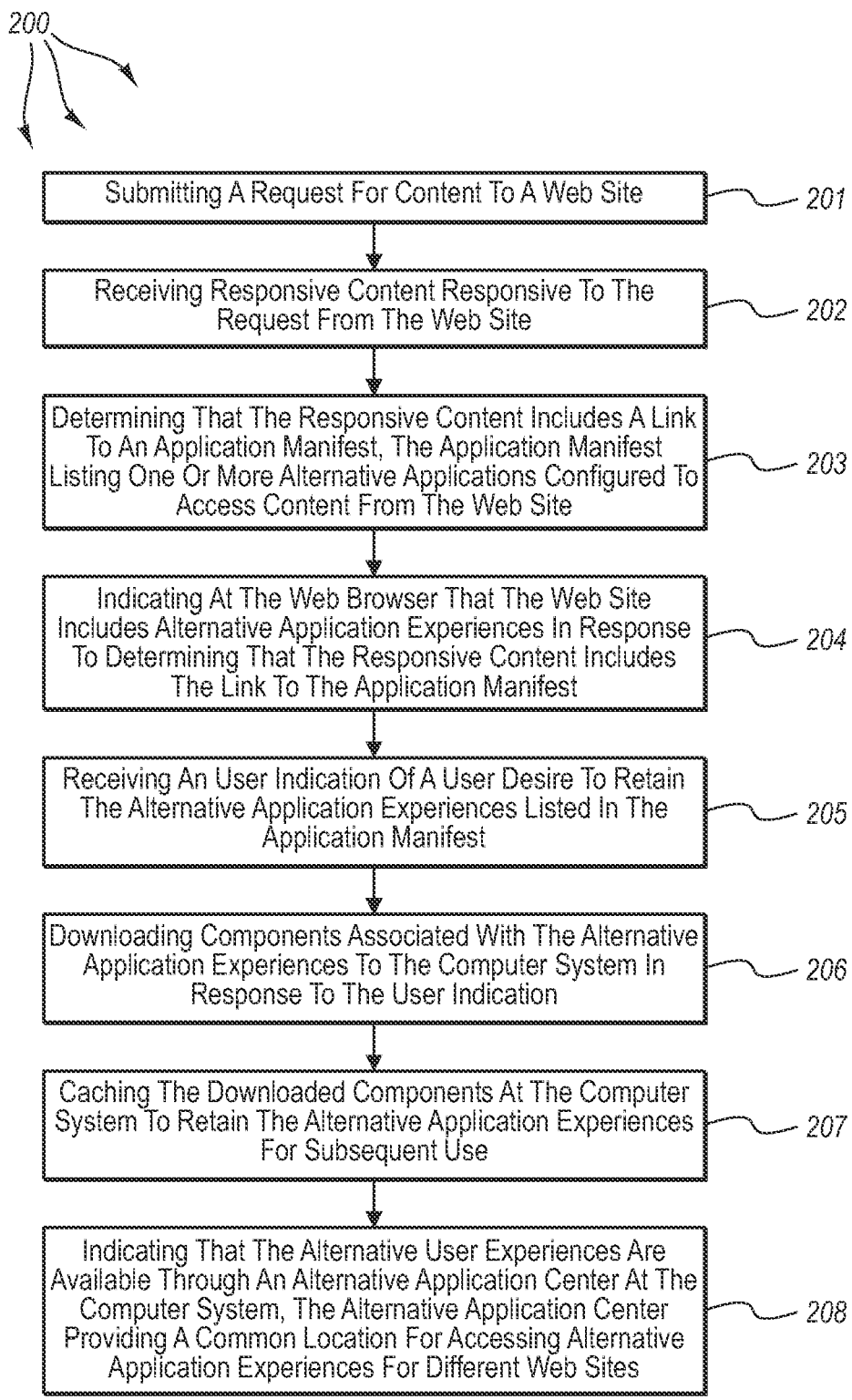
FIG. 2 illustrates a flow chart of an example method for discovering alternative user experiences for Websites.

FIG. 2 illustrates a flow chart of an example method 200 for discovering alternative user experiences for Websites. The method 200 will be described with respect to the components and data of computer architecture 100.

Method 200 includes an act of submitting a request for content to a Web site (act 201). For example, Web browser 102 can submit request 121 (e.g., an HTTP GET containing a URL for Web server 112) to Web server 112. Method 200 includes an act of receiving responsive content responsive to the request from the Web site (act 202). For example, Web browser 102 can receive response 122 responsive to request 121.

As depicted, response 122 includes header 123 and body 126. Header 123 and body 126 can be the header and body of an HTML message respectively. Body 126 can contain content responsive to request 121. Generally, header 126 can contain information about response 122 including title, keywords, and other information that is not necessarily considered content. As depicted, header 126 also includes manifest link 124. Web server 112 can embed manifest link 124 in header 123 prior to sending response 122.

Manifest link 124 can be of the format:
<head>
<link rel="alternate"type="application/localria"href="local.xml"title="Applications"/>
</head>

The link element includes attribute/value pairs conveying relationship information for accessing an alternative user experience for accessing content 114. The rel="alternate" attribute/value pair describes the relationship from body 126 to "local.xml" (i.e., the anchor specified in the href attribute) and designates local.xml as a substitute version of body 126. The type="application/localria" attribute/value pair gives an advisory hint that the content type of the content available at the link target address (i.e., for the substitute version of response 122) is Rich Internet Application (RIA) typed content. The "application/localria" type can be managed between Web browser 102 and Web server 112 and/or can be registered as a content type, such as, for example, a Mime Type, for expanded use. The hrer="local.xml" attribute/value pair specifies the location of alternative application manifest 128 defining a link between response 122 and alternative application manifest 128.

Generally, a title attribute can be used to provide advisory information about the link element. The value of the title attribute can provided as a user tool tip at a Web browser. Thus, the title="Applications" attribute/value pair indicates that the nature of manifest link 124 is related to "Applications". Web browser 102 can display the word "Applications" when hovering over a user-interface element presented as part of body 126.

Method 200 includes an act of determining that the responsive content includes a link to an application manifest, the application manifest listing one or more alternative applications configured to access content from the Web site (act 203). For example, Web browser 102 can determine that response 122 includes manifest link 124. Manifest link 124 can link to a portion of alternative applications 116 (e.g., "local.xml") that lists one or more alternative applications configured to access content from Web server 112. Method 200 includes an act of indicating at the Web browser that the Web site includes alternative application experiences in response to determining that the responsive content includes the link to the application manifest. For example, Web server 102 can active or "light up" sticky user-interface control 103 in response to determining that response 122 includes manifest link 124.

Figure 3:
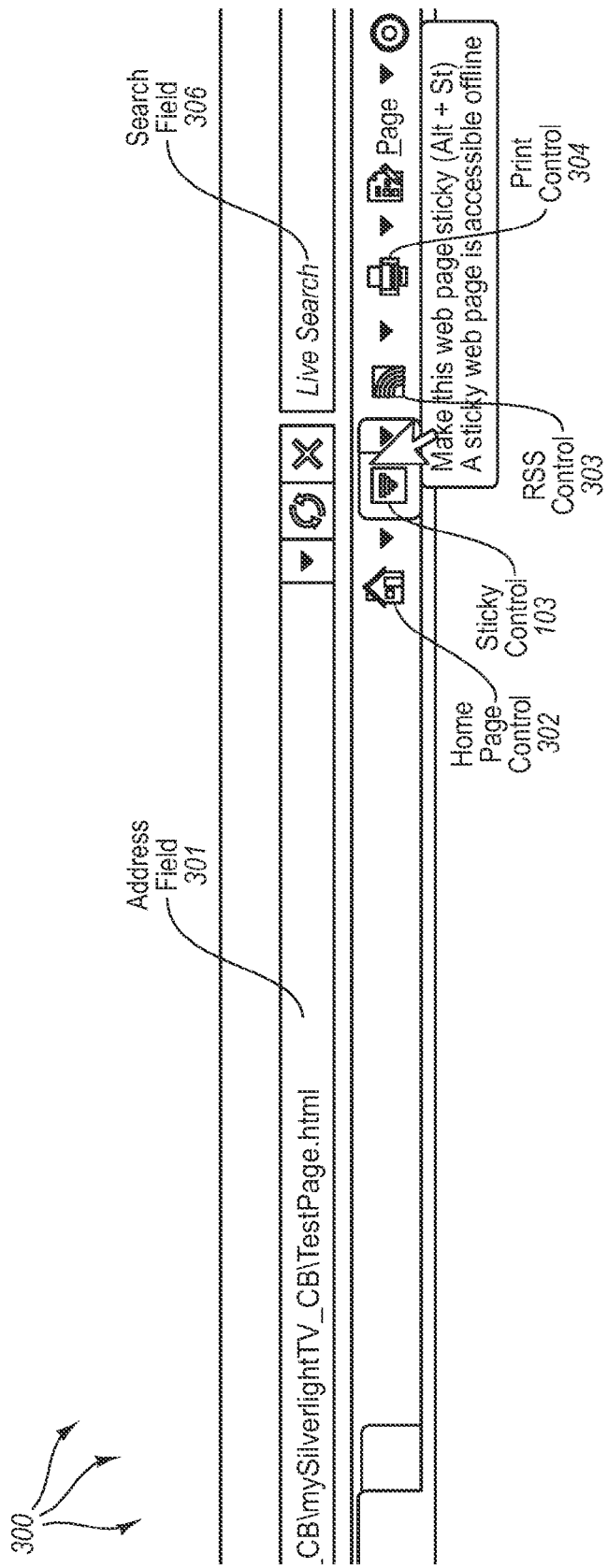
FIG. 3 illustrates a portion of a Web browser user-interface for saving alternative user experiences for Web sites.

Referring now to FIG. 3, FIG. 3 depicts a portion of a Web browser user-interface 300. Web browser user-interface 300 can facilitate saving alternative user experiences for Web sites. The functionality of Web browser user-interface 300 can be provided at Web browser 102. As depicted, Web browser user-interface 300 includes address field 301 (e.g., for submitting URLs), search field 306 for searching received content, home page control 302 for returning to a designated home page, print control 304 for printing received content, RSS control 303 for activating RSS formatted feeds (e.g., data of type="application/rss+xml"). Web browser user-interface 300 can also include sticky user-interface control 103 for making an alternative user experiences (e.g., RIAs) sticky at computer system 101.

Method 200 includes an act of receiving a user indication of a user desire to retain the alternative application experiences listed in the application manifest (act 204). For example, Web browser 102 can receive user-input 107 selecting sticky user-interface control 103.

Method 200 includes an act of downloading components associated with the alternative application experiences to the computer system in response to the user indication (act 205). For example, selection of sticky user-interface control 103 can cause Web browser 102 to utilize manifest link 124 to send alternative application request 127 to Web server 112. Alternative application request 127 can be a request for a portion of alternative applications 116, such as, for example, "local.xml". In response to receiving alternative application request 127, Web server 112 can pull alternative application manifest 128 (e.g, "local.xml") from alternative applications 116 and provide alternative application manifest 128 to Web browser 102.

In some embodiments, an alternative application is made sticky in an alternative application center by caching the application user experience (XAML, Image, Media), code DLLs and the necessary application reference data. The application can be packaged using a simple ZIP like file format with simple "sticky" manifest. Thus, alternative application manifest 128 can be of the format:

```
<?xml version="1.0" encoding="utf-8" ?>
<application>
    <description>MyTV</description>
    <version>1.0.0.0</version>
    <publisher>Timbuktourist</publisher>
    <icon>favicon.ico</icon>
    <manifestOrigin>http://example.com/Local.xml</manifestOrigin>
    <hosts>
        <!--- support multiple user experiences -->
        <!--- ability to inline info -->
        <host type="ria-local">
            <icon>favicon.ico</icon>
            <resources>
                <resource Source="ClientBin/TVSticky.xap"/>
            </resources>
            <startup>
                <param>...</param>
                <param>...</param>
                <param>...</param>
                <param>...</param>
            </startup>
            <resourceUpdatedSchedule frequency="daily" time="2:00AM" />
            <initialQuota>2048KB"</initialQuota>
        </host>
        <!--- integrate with existing installers -->
        <host type="clickonce">
            <resources>
                <resource Source="TVSticky.application"/>
            </resources>
        </host>
        <host type="ria-device">
            ...
        </host>
        <host type="gadget-sidebar">
            ...
        </host>
        <host type="gadget-live">
            ...
        </host>
        <host type="gadget-w3c">
            ...
        </host>
    </hosts>
</application>
```

Within alternative application manifest 128, application description ("MyTV") refers to the user friendly description of the alternative applications. Application publisher ("Timbuktourist") refers to the publisher of the alternative applications. Application icon ("favicon.ico") refers to the visual image for the alternative applications.

The manifest also includes multiple hosts sections. Each host section represents an alternative application including an application type, such as, for example, ria-local, clickonce, ria-device, gadget-sidebar, gadget-list, gadget-w3C, etc. Within each hosts section, a list of application resources (e.g., "ClientBin.TVSticky.xap", TVSticky.application", etc.) that should be synchronized/downloaded as a consistent unit are included. The resources can be identified using a simple relative URI. The default resource is the application ZIP file.

Method 200 includes an act of caching the downloaded components at the computer system to retain the alternative application experiences for subsequent use (act 206). For example, computer system 101 can cache components identified in alternative application manifest 128 (and/or provided by Web server 112) in alternative application cache 106. Cached components can include resources as well as configuration information indicated in alternative application manifest 128. These components can be grouped together and stored as application data 141.

In response to receiving alternative application manifest 128, computer system 101 may request further components from Web server 112 (e.g., using URLs contained in alternative application manifest 128). For example, computer system 101 can send component request 129 to Web server 112. In response to component request 129, Web server 112 can identify alternative application components 131 as relevant to the activation and use of alternative applications in alternative application manifest 128. Web server 112 can provide alternative application components 131 to computer system 101 for caching. These components can be grouped into application data 141 for storage in alternative application cache 106.

Method 200 includes an act of indicating that the alternative user experiences are available through an alternative application center at the computer system, the alternative application center providing a common location for accessing alternative application experiences for different Web sites (act 207). For example, the availability of alternative user experiences for accessing content 114 can be indicated through alternative application center 104.

Figure 4A:
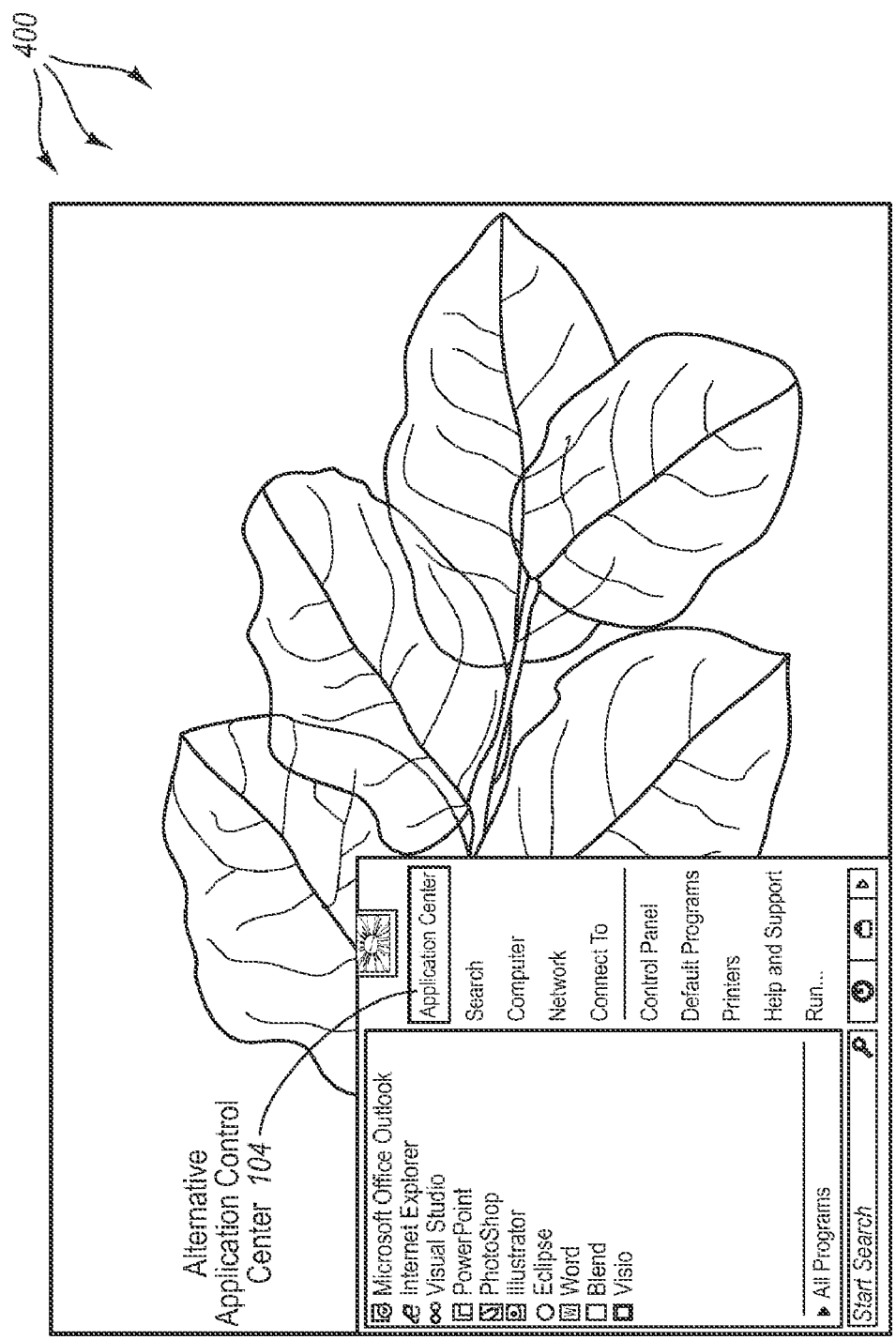
FIGS. 4A and 4B illustrate a portion of a user-interface for accessing and activating an alternative user experience for a Web site.
Figure 4B:
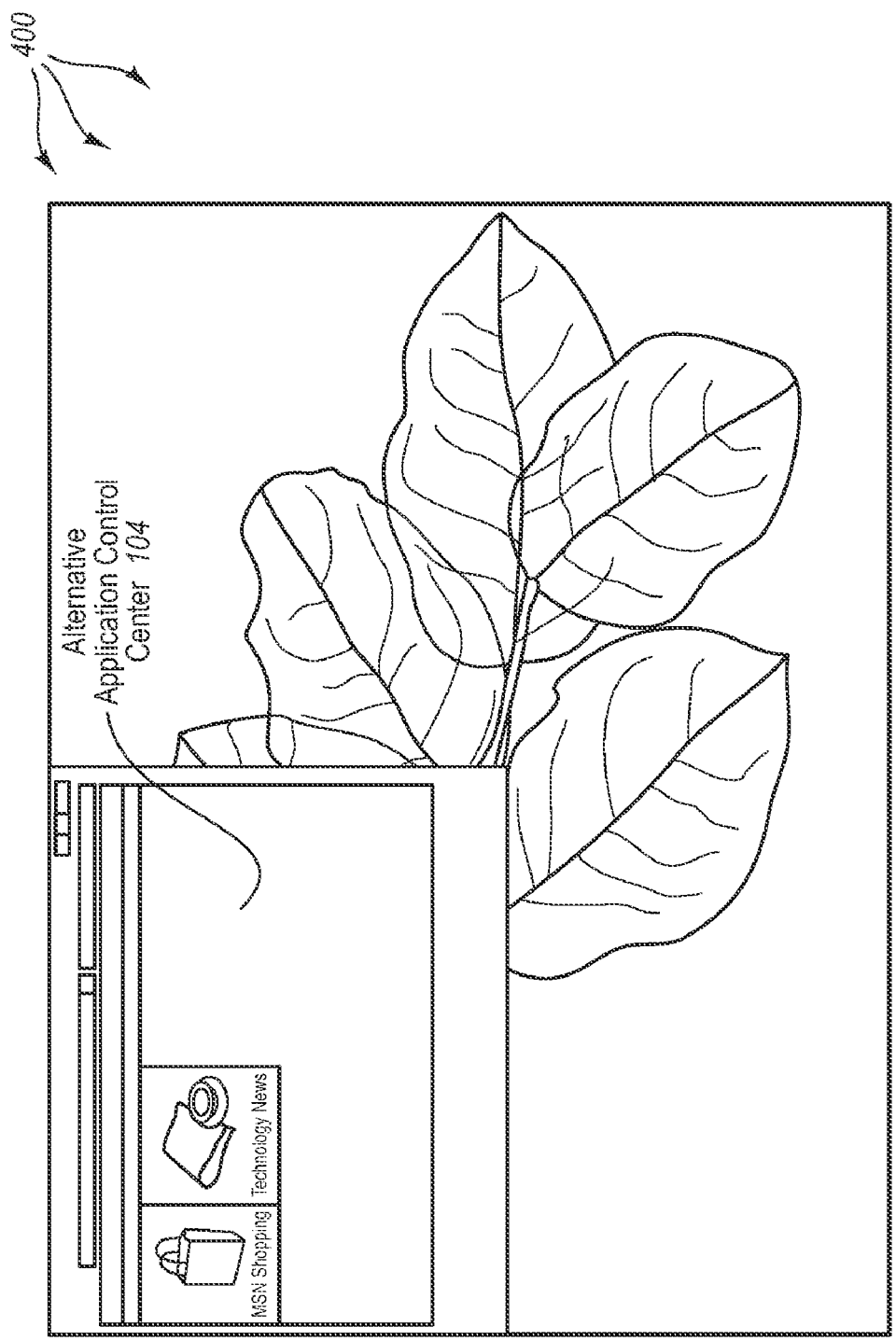

FIGS. 4A and 4B illustrate a portion of a user-interface 400 for accessing and activating an alternative user experience for a Web site. Referring now to FIG. 4A, alternative application control center 104 can be represented as a user-interface control in user-interface 400. Referring now to FIG. 4B, selection of the user-interface control can cause a listing of available alternative user experiences cached in alternative application cache 106 to be presented.

Thus, with a simple gesture a user can choose to make a RIA have a "sticky presence" on their machine. Sticky in the sense the application code and data resources for activating the application are locally cached. A sticky presence RIA is an alternative application that may reuse many of the code and UI assets of the in browser RIA.

Accordingly, embodiments of the invention permit a uses to navigate to a Web page that has an Alternative Application or "Sticky" RIA (e.g., an .EXE application, .MSI installation package, or ZIP file installation package) for the web site. In response to a Web browser detecting the alternative application or "Sticky" RIA, a "Make Sticky" button in the browser toolbar can be activated. A user can then click on the button and may be asked to confirm their action. Upon confirmation (when presented), the Alternative Application or "Sticky" RIA can be installed to the RIA Center.

Further, a Web developer can customize the user experience of making an alternative application "sticky". For example, a Web developer can add a user-interface control, such as, for example, a button to their application. When a user selected the button a LocalApplication.Install API can be called, passing a URL to the sticky manfiest. Additionally, when a Web developer provides a <link> element in the <head> of the HTML web page, the user can drag and drop the web page (from address bar) to the RIA Center.

Advantageously, using any of these mechanisms, the user gets to decide when to take the action to make the RIA sticky. Further, once an alternative application is cached, the application's resources and data are automatically updated in the background so that a user has access to updated user-interface experiences and data. For example, Web server 112 can update application data 141 when communication with computer system 101 is detected.

FIG. 1B illustrates a portion of computer architecture 100 that facilitates activating an alternative user experience for a Website. As depicted, FIG. 1B includes computer system 101 and computer system 111. In response to user-input 147 (input selecting an alternative application for activation) alternative application control center loads cached data 141 from alternative application cache 106. Alternative application control center 104 the process the application data 141 to activate alternative application 142.

Alternative application 142 can request Web-based data from Web server 112. For example, Alternative application 142 can send request 151 to Web server 112. Request 151 can be a request for a portion of content 114 (e.g., the content included in body 126 or some other Web-based data). In response to a request, Web server 112 can return Web-based data to alternative application 142. For example, Web server 112 can return content 164 to alternative application 142. Alternative application 142 can present content 164 at a user-interface.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including a Web browser, a method for discovering alternative user experiences for Websites, the method comprising:

an act of submitting a request for content to a Web site;

an act of receiving responsive content responsive to the request from the Web site;

an act of determining that the responsive content includes a link to an application manifest, the application manifest listing one or more alternative applications configured to access content from the Web site, wherein the one or more alternative applications are Rich Internet Applications (RIAs);

an act of indicating at the Web browser that the Web site includes the alternative applications in response to determining that the responsive content includes the link to the application manifest;

an act of receiving an user indication of a user desire to retain the alternative applications listed in the application manifest;

an act of downloading components associated with the alternative applications to the computer system in response to the user indication;

an act of caching the downloaded components at the computer system to retain the alternative applications for subsequent use;

an act of indicating that the alternative applications are available through an alternative application center at the computer system, the alternative application center providing a common location for accessing alternative applications for different Web sites;

an act of receiving user input for opening the alternative application center;

an act of presenting available alternative applications available to the user;

an act of receiving a user selection of one of the presented available alternative applications;

an act of accessing cached components for the alternative application to activate the alternative application for use;

an act of the alternative application submitting a request for content to the Web site;

an act of the alternative application receiving content back from the Web site in response to the request; and an act of presenting the received content at the alternative application.

2. The method as recited in claim 1, wherein an act of receiving responsive content responsive to the request from the Web site comprises an act of receiving an HTML document, the HTML document including a header and a body, the header containing the link to the application manifest.

3. The method as recited in claim 1, wherein the act of determining that the responsive content includes a link to an application manifest comprises an act of determining that the link is contained in an HTML header.

4. The method as recited in claim 3, wherein the act of determining that the responsive content includes a link to an application manifest comprises an act of determining that the link includes a URL for accessing the application manifest.

5. The method as recited in claim 4, wherein the act of downloading components associated with the alternative applications comprises an act of submitting the URL to the Web site.

6. The method as recited in claim 1, wherein the act of downloading components associated with the alternative applications comprises an act of downloading the application manifest.

7. The method as recited in claim 1, wherein the act of indicating at the Web browser that the Web site includes alternative applications comprises an act of lighting up a user-interface control of the Web browser.

8. The method as recited in claim 1, further comprising an act of updating the downloaded components subsequent to caching the downloaded components to make an updated version of an alternative application available to the user.

9. A computer program product for use at a computer system including one or more processors and system memory, the computer system also including a Web browser, the computer program product for implementing a method for discovering alternative user experiences for Websites, the computer program product comprising one or more computer storage media having stored thereon computer executable instructions that, when executed at a processor, cause the computer system to perform the method, including performing the following:
submit a request for content to a Web site;
receive responsive content responsive to the request from the Web site;
determine that the responsive content includes a link to an application manifest, the application manifest listing one or more alternative applications configured to access content from the Web site, wherein the one or more alternative applications are Rich Internet Applications (RIAs);
indicate at the Web browser that the Web site includes the alternative applications in response to determining that the responsive content includes the link to the application manifest;
receive an user indication of a user desire to retain the alternative applications listed in the application manifest;
download components associated with the alternative applications to the computer system in response to the user indication;
cache the downloaded components at the computer system to retain the alternative applications for subsequent use;
indicate that the alternative applications are available through an alternative application center at the computer system, the alternative application center providing a common location for accessing alternative applications for different Web sites;
receive user input for opening the alternative application center;
resent available alternative applications available to the user;
receive a user selection of one of the presented available alternative applications;
access cached components for the alternative application to activate the alternative application for use;
submit a request for content to the Web site;
receive content back from the Web site in response to the request; and
present the received content at the alternative application.

10. The computer program product as recited in claim 9, wherein computer executable instructions that, when executed, cause the computer system to receive responsive content responsive to the request from the Web site comprise computer executable instructions that, when executed, cause the computer system to receive an HTML document, the HTML document including a header and a body, the header containing the link to the application manifest.

11. The computer program product as recited in claim 9, wherein computer executable instructions that, when executed, cause the computer system to determine that the responsive content includes a link to an application manifest comprise computer executable instructions that, when executed, cause the computer system to determine that the link is contained in an HTML header.

12. The computer program product as recited in claim 11, wherein computer executable instructions that, when executed, cause the computer system to determine that the responsive content includes a link to an application manifest comprise computer executable instructions that, when executed, cause the computer system to determine that the link includes a URL for accessing the application manifest.

13. The computer program product as recited in claim 12, wherein computer executable instructions that, when executed, cause the computer system to download components associated with the alternative applications comprises computer executable instructions that, when executed, cause the computer system to submit the URL to the Web server.

14. The computer program product as recited in claim 9, wherein computer executable instructions that, when executed, cause the computer system to download components associated with the alternative applications comprise computer executable instructions that, when executed, cause the computer system to download the application manifest.

15. The computer program product as recited in claim 9, wherein computer executable instructions that, when executed, cause the computer system to indicate that the Web site includes alternative applications comprise computer executable instructions that, when executed, cause the computer system to light up a user-interface control of the Web browser.

16. The computer program product as recited in claim 9, further comprising computer executable instructions that, when executed, cause the computer system to update the downloaded components subsequent to caching the downloaded components to make an updated version an alternative application available to the user.

17. A distributed computing system, the distributed computing system comprising a Web browser computing system and a Web server computing system, wherein the Web browsing computing system includes:
one or more processors;
system memory;
one or more computer storage media having stored thereon computer executable instructions representing a Web browser and an alternative application control center, wherein the Web browser is configured to:
submit a request for content to a Web site;
receive responsive content responsive to the request from the Web site; determine that the responsive content includes a link to an application manifest, the application manifest listing one or more alternative applications configured to access content from the Web site, wherein the one or more alternative applications are Rich Internet Applications (RIAs);
indicate that the Web site includes the alternative applications in response to determining that the responsive content includes the link to the application manifest;
receive an user indication of a user desire to retain the alternative applications listed in the application manifest;
download components associated with the alternative applications to the computer system in response to the user indication;
cache the downloaded components at the computer system to retain the alternative applications for subsequent use; and
indicate that the alternative applications are available through an alternative application center at the computer system, the alternative application center providing a common location for accessing alternative applications for different Web sites;

and wherein the alternative application center is configured to:
  receive user input for opening the alternative application center;
  present available alternative applications available to the user;
  receive a user selection of one of the presented available alternative applications;
  access cached components for the alternative application to activate the alternative application for use;
  submit a request for content to the Web site;
  receive content back from the Web site in response to the request; and
  present the received content at the alternative application; and wherein the Web server computing system includes:
  one or more processors;
  system memory;
  one or more computer storage media having stored thereon computer executable instructions representing a Web server, wherein the Web server is configured to:
    manage the presentation of content for the Web site;
    respond to requests for content directed to the Web site from Web browsers and alternative applications;
    embed links to application manifests for alternative applications in messages returned in response to Web browser requests;
    provide cacheable components for activating alternative applications at Web browser computer systems; and
    updating the cached components for activating alternative applications at Web browser computer systems when communication with Web browser computer systems is detected.

18. The distributed computing system as recited in claim 17, wherein the distributed computing system is the Internet and wherein Web browser computer systems and Web server computer systems communication using HTTP messages containing HTML content.

* * * * *